United States Patent [19]
Bennett

[11] 3,947,033
[45] Mar. 30, 1976

[54] STEER ROPING TRAINING DEVICE

[76] Inventor: Randall A. Bennett, 539 N. Pierre Road, Walnut, Calif. 91789

[22] Filed: Aug. 2, 1974

[21] Appl. No.: 494,219

[52] U.S. Cl. ............ 273/105.2; 46/209; 273/105.6
[51] Int. Cl.² ............................................ F41J 9/02
[58] Field of Search ....... 273/105.2, 105.6, 102.2 R; 46/243, 244, 204, 210, 219, 209, 81; 119/29

[56] References Cited
UNITED STATES PATENTS

| | | | |
|---|---|---|---|
| 2,726,870 | 12/1955 | Auger | 273/105.2 |
| 2,819,900 | 1/1958 | Brackett | 273/105.2 |
| 3,047,295 | 7/1962 | Sachs | 273/105.2 |
| 3,303,821 | 2/1967 | Harris | 273/105.2 |
| 3,324,832 | 6/1967 | McCain | 273/105.2 |
| 3,392,980 | 7/1968 | Ortega | 273/105.6 |
| 3,406,969 | 10/1968 | Tisdell | 273/105.2 |
| 3,744,796 | 7/1973 | Renault | 273/105.2 |

Primary Examiner—Anton O. Oechsle
Assistant Examiner—Marvin Siskind
Attorney, Agent, or Firm—Philip M. Hinderstein

[57] ABSTRACT

A mechanical device having the general appearance of a steer for use in practicing steer roping. The device consists of a base section having a pair of spaced wheels mounted at the back thereof and a body section having at least one wheel mounted at the front thereof. The base and body sections are interconnected so as to permit pivotal movement of the body section relative to the base section about a forwardly directed generally horizontal axis in order to give the body section a life-like lean attitude when roped by the horns and towed by a horse. An inertia motor is mounted on the base section and connected to the drive wheels for powering the device. A pair of springs interconnect the base and body sections in order to bias the body section in a generally upright position. Means are also provided for accelerating and launching the device, thereby accelerating the inertia motor for continued movement of the device after launch.

9 Claims, 4 Drawing Figures

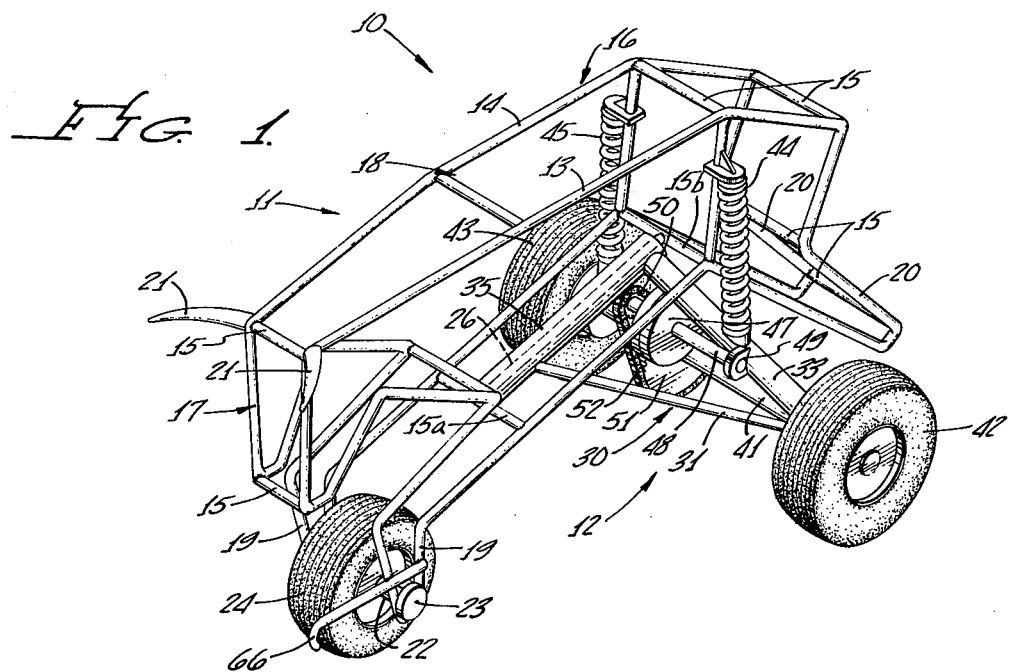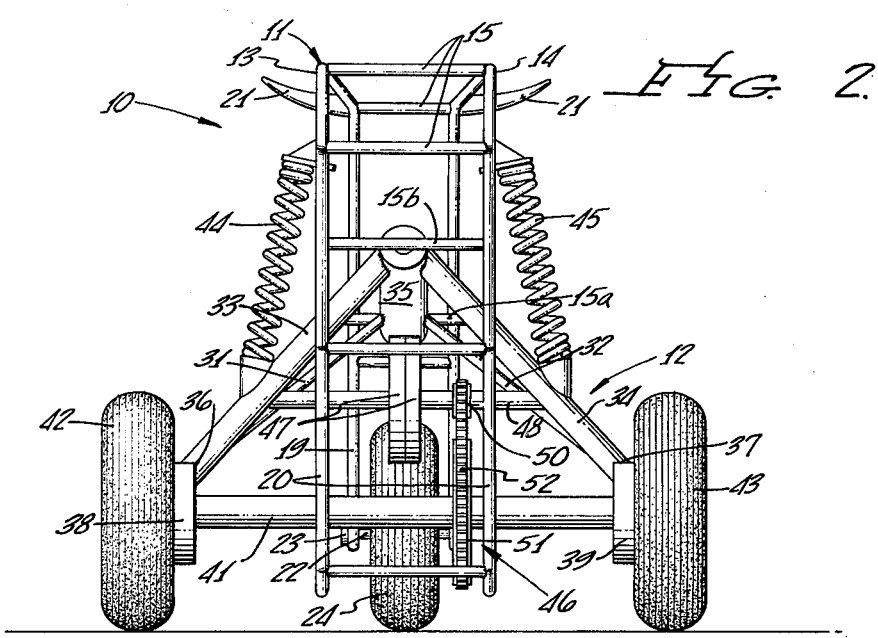

STEER ROPING TRAINING DEVICE

BACKGROUND OF THE INVENTION

1. Field of the Invention

The present invention relates to a steer roping training device and, more particularly, to a self-powered, self-guiding trackless, mechanical device having the general appearance of a steer for use in the training of steer roping.

2. Description of the Prior Art

In recent years, the sport of steer roping, whether it be individual or team roping, has become a very popular pastime across the nation. When practiced individually, the sport consists of chasing a steer across an arena and attempting to rope the horns of the steer. In team roping, a second rider attempts, after the first rider has roped the steer by the horns, to rope both of the hind legs of the steer.

It is therefore apparent that in order to practice the sport of steer roping, one must have an adequate size arena and one or more steers. However, steers for this purpose are in short supply and the ones that are available are expensive, require feeding and housing and the like.

In order to solve this problem, it has been proposed to provide a mechanical animal for use as a training aid. Prior mechanical animals have fallen into two general categories. One type, as represented by U.S. Pat. Nos. 3,303,821 and 3,324,832, have self-contained power sources and are, therefore, quite elaborate and expensive. The mechanical animal of the first-listed patent even includes a radio transmitter for controlling the operation of same. Thus, these types of mechanical animals are far too expensive for widespread use. The other type of mechanical animal, as represented by U.S. Pat. Nos. 3,711,098 and 3,776,553, are substantially simpler and do not include power sources. However, in these cases, the animal is so highly simplified that it does not represent a realistic training device.

SUMMARY OF THE INVENTION

In accordance with the present invention, there is provided a steer roping training device which solves these problems in a manner unknown heretofore. The present steer roping training device is far less complex and expensive than existing training devices having self-contained power sources, but still is extremely realistic and accurately simulates the action of a live steer. Thus, by using the present training device, one can become highly proficient in the sport of steer roping without a very large arena and without the use of live steers. Since no animals are required, all feeding, transporting, storage and nuisance problems are eliminated.

Briefly, the present steer roping training device consists of two main sections, a base section and a body section. The base section has a pair of spaced wheels mounted at the back thereof and drive means mounted thereon and being connected to both the wheels for rotating the wheels and moving the base section. The body section has at least one wheel mounted at the front thereof. Means are provided for interconnecting the base and body sections so as to permit pivotal movement of the body section relative to the base section about a forwardly directed generally horizontal axis to permit bidirectional sideward leaning of said body section relative to said base section. Means are also provided for biasing the body section in a generally upright position. However, when the body section is roped, it pivots about the axis, providing a life-like lean attitude and also assisting in steering the device. The drive means comprises an inertia motor mounted on the base section and means are provided for accelerating and launching the base section thereby accelerating the inertia motor for continued movement of the base section after launch.

OBJECTS

It is therefore an object of the present invention to provide a steer roping training device.

It is a further object of the present invention to provide a self-powered self-guiding trackless mechanical device having the general appearance of a steer for use in the training of steer roping.

It is a still further object of the present invention to provide a steer roping training device which is substantially less complex and less expensive than prior devices but which accurately simulates the action of a steer.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective view of a steer roping training device constructed in accordance with the teachings of the present invention;

FIG. 2 is a rear elevation view of the device of FIG. 1;

DESCRIPTION OF THE PREFERRED EMBODIMENT

Figure 3:
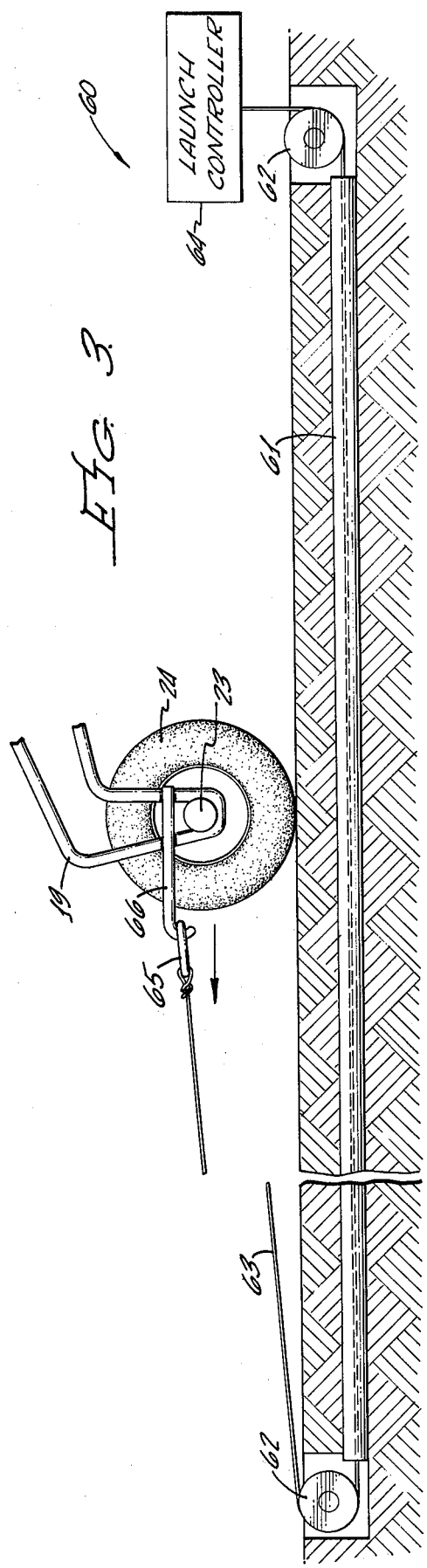
FIG. 3 is a schematic representation of a system for launching the steer roping training device of FIGS. 1 and 2.

Referring now to the drawings and, more particularly, to FIGS. 1 and 2 thereof, there is shown a mechanical steer, generally designated 10, which consists of a body section, generally designated 11, and a base section, generally designated 12. Both of sections 11 and 12 are shown as constructed primarily from tubing since that represents the simplest basic configuration of steer 10. However, it will be apparent to those skilled in the art that body section 11, for example, could be covered with a full body shell accurately simulating the appearance of a steer or calf, such shell being made from plastic, fiberglass, or any other suitable material.

Body section 11 includes a frame 16 having two identical sides 13 and 14, each of which is made from tubular elements shaped to simulate the appearance of a steer. Frame sides 13 and 14 are mounted in parallel, spaced relationship and interconnected by means of a plurality of crossmembers 15. Thus, frame 16 defines a head 17, a body 18, and front and rear legs 19 and 20, respectively. Connected to the upper front edge of head 17 are additional tubular elements defining horns 21.

Body section 11 also includes an axle 22 connected between frame sides 13 and 14, at the front thereof, between front legs 19. Each of front legs 19 may support a bearing 23 for mounting the opposite ends of axle 22 for rotation about an axis perpendicular to the front-to-back axis of body section 11. Furthermore, centrally mounted on axle 22 is a front wheel 24. Finally, body section 11 includes a shaft 26 positioned halfway between frame sides 13 and 14, and connected at its opposite ends to crossmembers 15a and 15b, shaft 26 being generally horizontal, coplanar with the front-to-back axis of body section 11, and positioned coplanar with the belly line of body section 11, for reasons which will appear more fully hereinafter.

Base section 12 includes a frame 30 including four tubular elements 31–34. Base section 12 also includes an elongate tubular member 35 which is adapted to receive shaft 26 and to mount shaft 26 for pivotal movement therein. First ends of tubular elements 31 and 32 are connected to the front end of tubular member 35 whereas first ends of tubular elements 33 and 34 are connected to the rear end of tubular member 35. The opposite ends of tubular elements 31 and 33 on the one hand and tubular elements 32 and 34 on the other hand extend in opposite directions and are joined together, at 36 and 37, respectively, to define a generally triangular construction. The intersection between tubular elements 31 and 33, at 36, supports a first bearing 38, whereas the intersection between tubular elements 32 and 34, at 37, supports a second bearing 39. Bearings 38 and 39 mount the opposite ends of an axle 41 which extends therethrough and supports a pair of drive wheels 42 and 43.

Longitudinal movement of shaft 26 relative to tubular member 35 is prevented by positioning tubular member 35 between crossmembers 15a and 15b. Furthermore, in order to stabilize body section 11 relative to base section 12 and to bias body section 11 in a generally upright position, mechanical steer 10 includes a pair of tension members 44 and 45, tension member 44 being connected between frame side 13 and tubular element 33 and tension member 45 being connected between frame side 14 and tubular element 34. Tension members 44 and 45 may be tension springs, shock absorbers, rubber bushings, compression springs, or the like.

In order to power steer 10, steer 10 includes drive means, generally designated 46, mounted on base section 12, and being connected to at least one of, but preferably both of, wheels 42 and 43 for rotating some about the axis of axle 41. According to the preferred embodiment of the present invention, and as explained more fully hereinafter, drive means 46 is an inertia motor consisting of one or more heavy flywheels 47. Flywheels 47 are mounted on base section 12 by means of an axle 48, the opposite ends of which are connected to bearings 49 connected to tubular elements 33 and 34. In order to connect flywheels 47 to wheels 42 and 43, drive means 46 also includes a pair of sprocket wheels 50 and 51 mounted on axles 48 and 41, respectively, so as to be coplanar. A chain 52 interconnects sprocket wheels 50 and 51 so that flywheels 47 rotate axle 48 and sprocket wheel 50, driving chain 51, thereby rotating sprocket wheel 51, axle 41, and wheels 42 and 43.

Referring now to FIG. 3, the present training device includes means, generally designated 60, for accelerating and launching steer 10, thereby accelerating flywheels 47 which continue to move base section 12 and steer 10 after launch. More specifically, the launching of steer 10 may be achieved by mounting a length of tubing 61 beneath the ground, tubing 61 supporting a pair of pulleys 62 at the opposite ends thereof. Extending through tubing 61 and around pulley 62 is a cable 63. One end of cable 63 is connected to a launch controller 64 whereas the other end of cable 63 includes a ring 65. Ring 65 is adapted to receive a hook 66 connected to front legs of steer 10, on opposite sides of wheel 24. Furthermore, launch controller 64 may be any powered device, such as a winch, for gradually accelerating cable 63 in order to accelerate and launch steer 10.

OPERATION

In order to accomplish the launching of steer 10, cable 63 is completely unwound and steer 10 is positioned near launch controller 64 with hook 66 on steer 10 engaging ring 65 at the end of cable 63. Launch controller 64 is then activated to start reeling in cable 63, thereby pulling steer 10 in the direction of tubing 61. The pulling of steer 10 causes the rotation of drive wheels 42 and 43 as a result of the friction between them and the ground. Rotation of wheels 42 and 43 rotates axle 41 and sprocket wheel 51, thereby driving chain 52 and rotating sprocket wheel 50 and axle 48. Therefore, flywheels 47 begin to accelerate about axle 48 as steer 10 accelerates forwardly.

By the time steer 10 reaches the end of tubing 61, it is going at a speed typical of a steer when it is released from its gate. As wheel 24 passes the end of tubing 61, ring 65 automatically releases hook 66, thereby disconnecting steer 10 and cable 63. At this time, flywheels 47 are rotating rapidly about the axis of axle 48. Due to the weight of flywheels 47, the inertia thereof continues this rotation, as well known to those skilled in the art, continuing to drive wheels 42 and 43 by means of axles 48 and 41, sprocket wheels 50 and 51, and chain 52. Thus, steer 10 continues to be driven by flywheels 47 even after it is released from cable 63. Furthermore, because of springs 44 and 45 holding body section 11 in an upright position, wheel 24 is vertical and steer 10 continues to move along a straight line.

Figure 4:
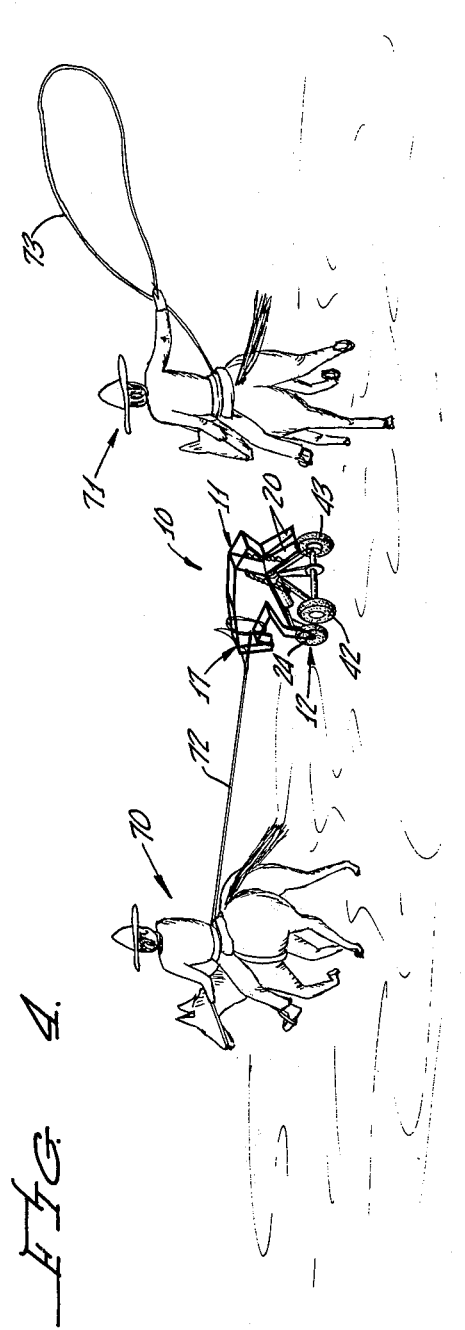
FIG. 4 is a diagrammatic view showing the present steer roping training device in use.

Referring now to FIG. 4, a first rider, designated 70, may now chase steer 10 and attempt to lasso horns 21 thereof. If rider 70 misses steer 10, it will continue to move until the inertia of flywheels 47 is expended and steer 10 stops. On the other hand, if rider 70 catches horns 21 of steer 10, rider 70 may change the direction of steer 10 to return it to the starting position or to expose one of rear legs 20 to a second rider 71. More specifically, if rider 70 applies a lateral force to his lasso 72 when it is attached to horns 21, this will cause body section 11 to pivot about tubular member 35, stretching one of springs 44 or 45. As body section 11 leans over, front wheel 24 is also tilted in the same direction, permitting steer 10 to be steered in a circular path more readily. On the other hand, the momentum of steer 10 and drive means 46 tries to keep steer 10 moving in a straight direction so that the action of steer 10 accurately simulates the resistance which is present when roping a live steer.

In any event, when body section 11 of steer 10 leans to one side or the other, legs 20, which extend beyond the back of drive wheels 42 and 43, extend outwardly, exposing such legs to rider 71 who may now attempt to rope such legs with his lasso 73. Thus, steer 10 is suitable for use either as a training aid for individual roping or as a training aid for team roping.

While the invention has been described with respect to a preferred physical embodiment constructed in accordance therewith, it will be apparent to those skilled in the art that various modifications and improvements may be made without departing from the scope and spirit of the invention. For example, changes may be made to the shape of body section 11 and provision could even be made to cause rear legs 20 to pulsate as steer 10 moves to give a more life-like appearance and effect for a better heel catch. By making mechanical steer 10 smaller with a narrower wheel base, one could simulate a calf for practicing calf roping. Under such circumstances, the calf version would be upsettable and by adding spring loaded legs could be thrown over and the legs tied. Accordingly, it is to be understood that the invention is not to be limited by the specific illustrative embodiment, but only by the scope of the appended claims.

I claim:

1. A self-guiding, trackless steer roping training device comprising:
   a base section having a pair of spaced drive wheels mounted at the back thereof;
   drive means mounted on said base section and being connected to at least one of said drive wheels for rotating said wheels and moving said base section;
   a body section having at least one wheel mounted at the front thereof and including a pair of rear legs which extend downwardly and rearwardly of said base section;
   means interconnecting said base and body sections and permitting pivotal movement of said body section relative to said base section about a forwardly-directed, generally horizontal axis to permit bidirectional sideward leaning of said body section relative to said base section, sideward leaning of said body section relative to said base section exposing said rear legs of said body section for roping of same; and
   means for biasing said body section in a generally upright position.

2. A steer roping training device according to claim 1 wherein said biasing means comprises:
   tension means connected between opposite sides of said body section and said base section, said tension means being yieldable to permit said body section to lean sidewardly, in either of opposite directions, when forced laterally.

3. A steer roping training device according to claim 1 further comprising:
   means releasably connected to said base and body sections for accelerating and launching said base section thereby accelerating said flywheel for continued movement of said base section after launch.

4. A self-guiding, trackless steer roping training device comprising:
   a base section including a frame, a wheel axle connected to the rear of said frame, and a pair of spaced drive wheels mounted at opposite ends of said wheel axle;
   drive means including a drive axle connected to said frame in parallel, spaced relationship to said wheel axle, a flywheel mounted on said drive axle, and means for interconnecting said flywheel and at least one of said drive wheels for rotating said wheels and moving said base section;
   a body section having at least one wheel mounted at the front thereof;
   means interconnecting said base and body sections and permitting pivotal movement of said body section relative to said base section about a forwardly-directed, generally horizontal axis to permit bidirectional sideward leaning of said body section relative to said base section; and
   means for biasing said body section in a generally upright position.

5. A steer roping training device according to claim 4 wherein said means for interconnecting said flywheel and said at least one drive wheel comprises:
   a pair of sprocket wheels mounted on said drive and wheel axles; and
   a chain interconnecting said sprocket wheels.

6. A self-guiding, trackless steer roping training device comprising:
   a base section having a pair of spaced drive wheels mounted at the back thereof;
   drive means mounted on said base section and being connected to at least one of said drive wheels for rotating said wheels and moving said base section;
   a body section having at least one wheel mounted at the front thereof;
   means interconnecting said base and body sections and permitting pivotal movement of said body section relative to said base section about a forwardly directed, generally horizontal axis to permit bidirectional sideward leaning of said body section relative to said base section, said interconnecting means comprising:
   an elongate tubular member mounted on said base section and defining said generally horizontal axis; and
   a shaft mounted on said body section and extending through said tubular member and being supported thereby for pivotal movement therein; and
   means for biasing said body section in a generally upright position.

7. A steer roping training device according to claim 6 wherein said base section comprises:
   a frame; and
   an axle connected to the rear of said frame, said spaced drive wheels being mounted at opposite ends of said axle, and wherein said body section comprises:
   a frame; and
   an axle connected to the front of said frame, said front wheel being centrally mounted on said axle.

8. A steer roping training device according to claim 7 wherein said biasing means comprises:
   a pair of springs connected between opposite sides of said body section frame and said base section frame to bias said body section frame in a generally upright position, said springs being yieldable to permit said body section to lean sidewardly when roped.

9. A steer roping training device according to claim 8 wherein pivoting of said body section relative to said base section pivots said body section axle and said front wheel assisting in steering said device.

* * * * *